United States Patent
Wei et al.

(10) Patent No.: US 10,635,541 B2
(45) Date of Patent: Apr. 28, 2020

(54) FINE-GRAINED CONFLICT RESOLUTION IN A SHARED LOG

(71) Applicant: Nicira, Inc., Palo Alto, CA (US)

(72) Inventors: Michael Wei, Palo Alto, CA (US); Dahlia Malkhi, Palo Alto, CA (US); Medhavi Dhawan, Cupertino, CA (US); Maithem Munshed, Palo Alto, CA (US); Anny Martinez Manzanilla, Santa Clara, CA (US); Roger Michoud, Menlo Park, CA (US); Zeeshan Altaf Lokhandwala, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 163 days.

(21) Appl. No.: 15/791,280

(22) Filed: Oct. 23, 2017

(65) Prior Publication Data

US 2019/0121704 A1    Apr. 25, 2019

(51) Int. Cl.
| | |
|---|---|
| G06F 16/00 | (2019.01) |
| G06F 11/14 | (2006.01) |
| G06F 16/90 | (2019.01) |
| G06F 16/23 | (2019.01) |

(52) U.S. Cl.
CPC ...... *G06F 11/1448* (2013.01); *G06F 16/2308* (2019.01); *G06F 16/90* (2019.01); *G06F 2201/80* (2013.01)

(58) Field of Classification Search
CPC ...... G06F 16/2308; G06F 16/90; G06F 16/00; G06F 17/30; G06F 17/30321; G06F 17/30339; G06F 17/30144; G06F 17/30377; G06F 17/30368; G06F 17/30371; G06F 11/1448; G06F 2201/80; G06F 9/466; G06F 16/2228; G06F 16/2282; G06F 16/2379; G06F 16/2358; G06F 16/221; G06F 16/2365; G06F 16/1734; G06F 16/2322; G06F 11/1471; G06F 16/1865; G06F 17/30386

See application file for complete search history.

(56) References Cited

U.S. PATENT DOCUMENTS

| | | | |
|---|---|---|---|
| 6,237,001 B1 * | 5/2001 | Bamford | G06F 9/466 |
| 7,043,665 B2 | 5/2006 | Kern et al. | |
| 10,108,658 B1 * | 10/2018 | Cole | G06F 16/2365 |
| 10,262,000 B1 | 4/2019 | Bent et al. | |
| 2002/0165724 A1 * | 11/2002 | Blankesteijn | G06Q 30/06 705/1.1 |

(Continued)

OTHER PUBLICATIONS

Mahesh Balakrishnan et al., "CORFU: A Shared Log Design for Flash Clusters", 9th USENIX Symposium on Networked Systems Design and Implementation, Apr. 25-27, 2012, 14 pages.

(Continued)

*Primary Examiner* — Anh Ly

(57) ABSTRACT

In accordance with disclosed embodiments, a shared log system includes a sequencer to verify transactions that comprise a source object and one or more members of the source object (source data objects), a target object and one or more members of the target object (target data objects), and a snapshot time reference. The sequencer verifies transaction using the snapshot time to determine whether the data states of the source data objects at the time of the snapshot time represent their most current data state in a shared log.

19 Claims, 8 Drawing Sheets

(56) References Cited

U.S. PATENT DOCUMENTS

| | | |
|---|---|---|
| 2003/0177187 A1 | 9/2003 | Levine et al. |
| 2004/0260899 A1 | 12/2004 | Kern et al. |
| 2008/0294808 A1 | 11/2008 | Mahalingam et al. |
| 2010/0211554 A1* | 8/2010 | Reid .................. G06F 16/2315 707/703 |
| 2010/0332495 A1 | 12/2010 | Richter et al. |
| 2012/0011106 A1* | 1/2012 | Reid ...................... G06F 9/466 707/695 |
| 2012/0239886 A1 | 9/2012 | Rantanen |
| 2013/0110767 A1* | 5/2013 | Tatemura ................ G06F 16/27 707/607 |
| 2013/0325803 A1* | 12/2013 | Akirav ................ G06F 11/1451 707/634 |
| 2014/0101225 A1 | 4/2014 | Abu-Libden et al. |
| 2014/0108642 A1* | 4/2014 | Cheriton ................ G06F 9/542 709/224 |
| 2014/0172898 A1* | 6/2014 | Aguilera ............ G06F 16/2445 707/759 |
| 2014/0025770 A1 | 9/2014 | Warfield et al. |
| 2015/0160974 A1* | 6/2015 | Kishore ................ G06F 9/4881 718/106 |
| 2015/0277969 A1 | 10/2015 | Strauss et al. |
| 2016/0070771 A1* | 3/2016 | Vermeulen ............. G06F 16/27 707/687 |
| 2016/0085834 A1* | 3/2016 | Gleeson .............. G06F 16/2282 707/693 |
| 2016/0086260 A1* | 3/2016 | Vermeulen ............ G06Q 40/00 705/35 |
| 2016/0301753 A1 | 10/2016 | Auch et al. |
| 2017/0010772 A1 | 1/2017 | Matthews et al. |
| 2017/0220617 A1* | 8/2017 | Bortnikov ........... G06F 16/2329 |
| 2017/0287090 A1* | 10/2017 | Hunn ..................... G06Q 50/18 |
| 2017/0344593 A1* | 11/2017 | Mullick ................ G06F 16/273 |
| 2018/0120199 A1 | 5/2018 | Vaquero Gonzalez et al. |
| 2018/0260631 A1* | 9/2018 | Watanabe ............ A61D 17/008 |
| 2018/0276234 A1* | 9/2018 | Wei ..................... G06F 16/1734 |
| 2018/0372435 A1 | 12/2018 | Kramer |
| 2019/0121888 A1 | 4/2019 | Xu et al. |
| 2019/0129982 A1 | 5/2019 | Wei et al. |

OTHER PUBLICATIONS

Mahesh Balakrishnan et al., "Tango: Distributed Data Structures over a Shared Log", Nov. 1, 2013, 16 pages.

Philip A. Bernstein et al., "Hyder—A Transactional Record Manager for Shared Flash", 5th Biennial Conference on Innovative Data Systems Research (CIDR '11), Jan. 9-12, 2011, 12 pages.

Michael Wei et al., "vCorfu: A Cloud-Scale Object Store on a Shared Log", VMware Research Group, Jan. 2017, 15 pages.

* cited by examiner

| ID | name | phone # | # on loan | # overdue | total fees |
|---|---|---|---|---|---|
| 1 | Gabby | 555-0003 | 4 | 0 | $0.00 |
| 2 | Joan | 617-9889 | 5 | 3 | $3.00 |
| 3 | James | 889-9291 | 1 | 1 | $1.00 |
| 4 | Nancy | 721-5371 | 0 | 4 | $4.00 |
| 5 | Gregg | 841-0023 | 5 | 0 | $0.00 |
| ... | | | | | | library user DB table, 200

FIG. 2

FINE-GRAINED CONFLICT RESOLUTION IN A SHARED LOG

CROSS REFERENCE TO RELATED APPLICATIONS

This application is related to the following commonly owned co-pending U.S. applications for patent, the content of each of which is incorporated herein by reference in its entirety for all purposes:

U.S. application Ser. No. 15/652,981, filed Jul. 18, 2017,
U.S. application Ser. No. 15/791,257, filed concurrently, titled "Direct Access to Object State in a Shared Log"
U.S. application Ser. No. 15/798,073, titled "Just-in-Time Multi-Indexed Tables in a Shared Log"

BACKGROUND

Transactions are a fundamental building block for reliable concurrent systems. They enable programmers to express a unit of work which a system will perform, and provide guarantees on how that unit of work will be executed with respect to other transactions in the system. In a distributed system, multiple clients can simultaneously request transactions, and these transactions can sometimes conflict with each other, depending on the guarantees provided by the system. For instance, two transactions in an object store can try to modify the same object. In most systems, a transaction manager can be used detect such conflicts and can abort one of the transactions to maintain correctness. Conventional systems typically achieve this through the use of locks or write-ahead logging, global logging and the like, or otherwise can relax certain guarantees provided by the system. Locking and write-ahead logging require considerable overhead, which can hamper throughput and increase latency, and thus can be deemed "heavyweight" processes for this reason. Global logging, on the other hand, is a technique where conflict resolution is derived from recording every transaction on a single global log. Global logging imposes a burden on the client with having to perform their own transaction resolution. Since no entity maintains the latest version of each object, the client must playback the entire log to find the latest versions of each object of interest in order to determine whether or not a conflict occurs. In addition, aborted transactions can be logged which can slow the playback process and greatly limit the scalability of the system as the number of clients grow.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 shows an example to illustrate objects and members of an object.

DETAILED DESCRIPTION

The present disclosure is directed to distributed transactional systems in which the ordering of transactions can be processed by a sequencer. A sequencer in accordance with the present disclosure can replace conventional heavyweight mechanisms that use locking, write-ahead logging, and other processing that can burden the client. Funneling all transactions through a lightweight transaction sequencer to perform conflict resolution and keep track of the state of each object in the system (and in particular each member in that object) can reduce the processing burdens on clients and allows the system to scale up.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
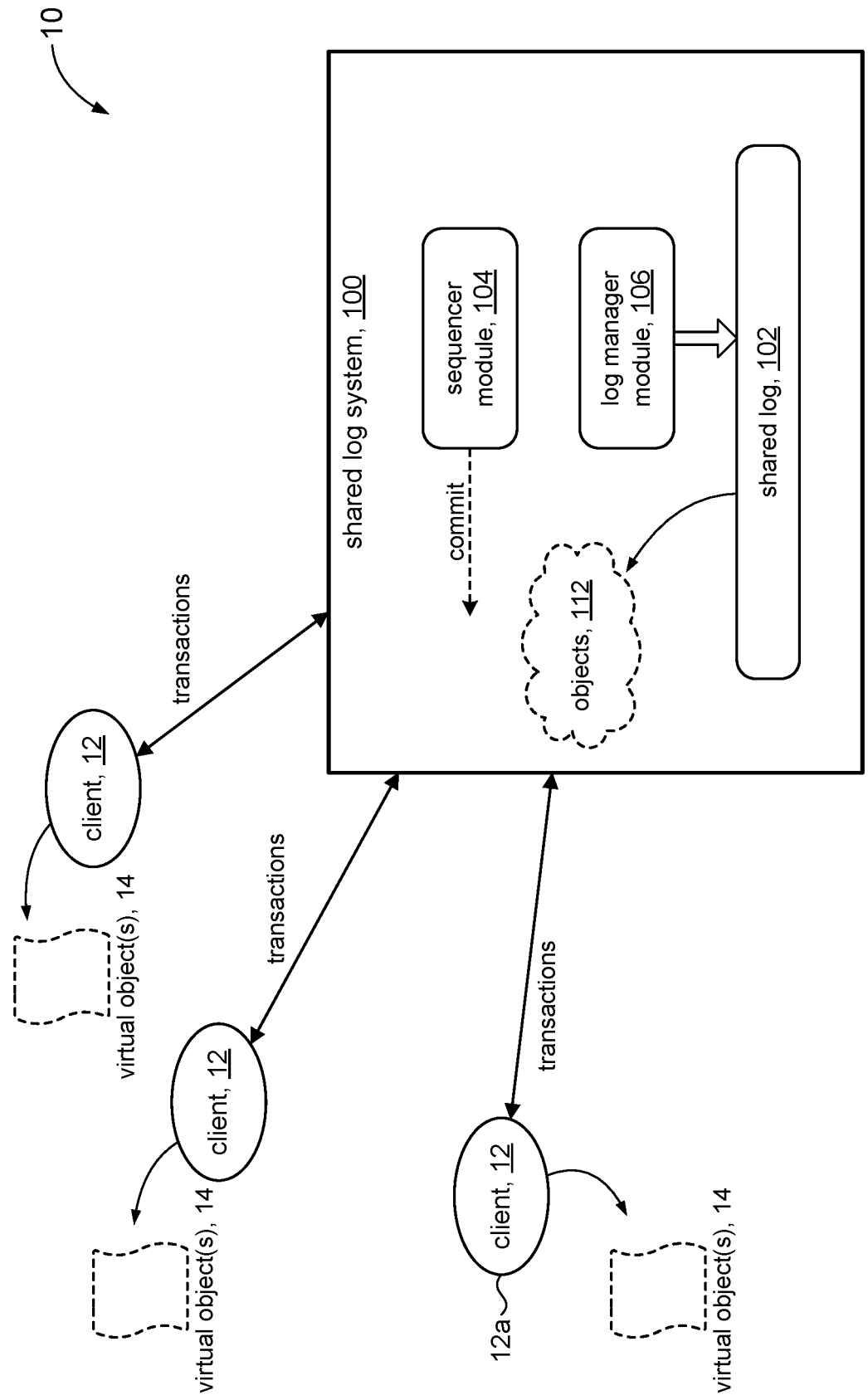
FIG. 1 shows a system comprising a shared log in accordance with the present disclosure.

FIG. 1 shows an example of a distributed system 10 comprising a shared log system 100 in accordance with the present disclosure. The shared log system 100 represents objects 112 that clients 12 can access (read and write); objects 112 can be shared among the clients 12. In some embodiments, for example, the shared log system 100 comprises a shared log 102 (also referred to as a distributed log) that maintains the data state of objects 112 by storing transactions made on those objects 112 by clients 12. Clients 12 can append entries to the shared log 102. Clients 12 can read (e.g., a get operation) an entry at a particular offset in the shared log 102. Clients 12 can interact with the shared log 102 via transactions. Transactions can include operations such as create, read, update, delete, various arithmetic operations, and so on.

The "data state" of an object 112 at a given point in time refers to the value or values of the object at that time, namely the state of the data that comprises the object 112. For example, if the object 112 is a numerical object, then at time $t_1$ its data state might be the value 1.4142, and at another time $t_2$ its data state might be the value 3.14159, and so on. Likewise, if the object 112 is a textual object its data state can be a particular sequence of text at one time, and a different sequence of text at another time.

In shared log systems, such as depicted in FIG. 1, objects 112 typically are not persisted but rather exist only in terms of the history of client transactions performed on the objects 112. A client 12 can instantiate and maintain its own copies of the objects 112 as virtual objects 14. The most current data state of a virtual object 14, for example, can be obtained by accessing individual transactions (updates) stored in the shared log 102 that were made on an object 112 of interest, and replaying those transactions by sequentially applying the sequence of computations and/or operations made on the object 112.

In accordance with the present disclosure, the shared log system 100 can include a sequencer module 104 and a log manager module 106. To append a transaction to the shared log 102, the sequencer module 104 can provide the client 12 with the next free offset in the shared log 102. The client 12 can complete the append operation by directly issuing write request (e.g., put operation) to the log manager module 106. The log manager module 106 provides buffering of data associated with transactions to be committed to the shared log 102. These aspects of the present disclosure are discussed in more detail below.

In some embodiments, objects 112 can comprise structured data. Merely to illustrate this point, consider the database table 200 of a library database shown in FIG. 2. The database table 200 may be a database table of users of the library. Each record (row) 202 in the library user database table can include data fields 204 such as record ID, name, city of residence, phone number, number of books on loan, number of overdue books, total overdue fees, and so on. Each row 202 in the database table 200 can be considered an object 112, and each data field 204 in a row 202 can be referred to as an "object member" of that object. In some specific embodiments, objects 112 may be referred to as "maps" and object members may be referred to a "keys." However, the more general terms "object" and "object member" will be used throughout.

In some embodiments, where an object comprises multiple separate object members, it may be desirable to allow two or more transactions to concurrently access different object members within the same object without conflict. Referring to the database table 200 in FIG. 2 to illustrate this point, for example, a first client can access the record (object) for Gabby to update the "number of books on loan" data field (object member), while a second concurrent client can access the same record to update Gabby's phone number. Although both clients access Gabby's record, there is no conflict since the clients access different data fields in Gabby's record. On the other hand, if the first and second clients target the same data field, then a conflict can arise. Thus, at the object level a conflict may be indicated, but at the level of the object members, there may not be actual conflict. The discussion will now turn to a description of various embodiments in accordance with the present disclosure to resolve "fine-grained" (i.e., at the resolution of object members of an object) conflicts as compared to "coarse-grained" (at the resolution of the objects themselves) conflicts, which can improve system performance by allowing transactions from multiple clients to concurrently access and/or modify (update) a given object, but different members in that given object.

Figure 3:
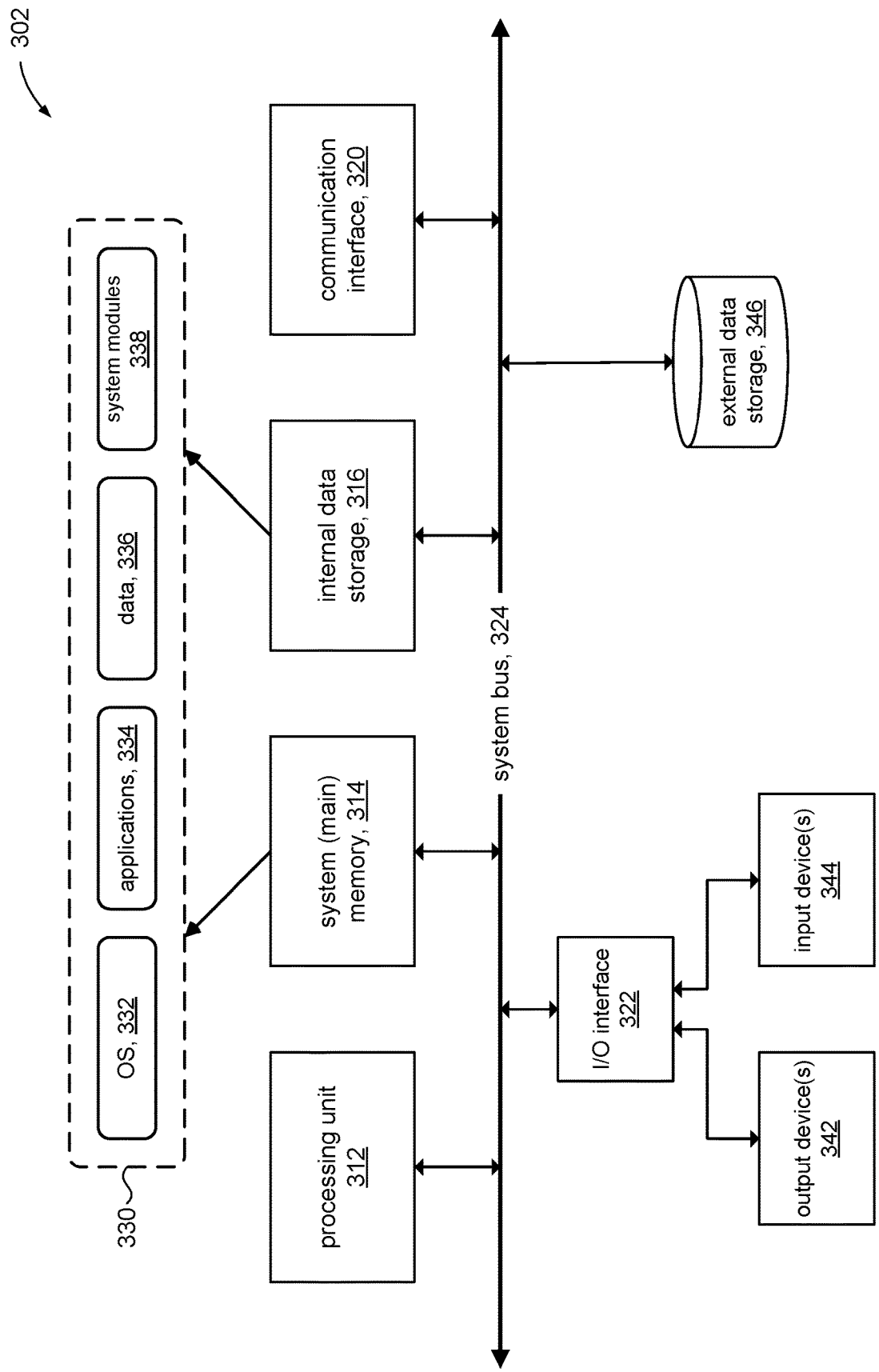
FIG. 3 shows an illustrative example of a computer system in accordance with the present disclosure.

FIG. 3 is a simplified block diagram of an illustrative computing system 302 for implementing one or more of the embodiments described herein. For example, the computing system 302 can perform and/or be a means for performing, either alone or in combination with other elements, operations in the shared log system 100 in accordance with the present disclosure. Computing system 302 can also perform and/or be a means for performing any other steps, methods, or processes described herein.

Computing system 302 can include any single or multi-processor computing device or system capable of executing computer-readable instructions. Examples of computing system 302 include, for example, workstations, laptops, client-side terminals, servers, distributed computing systems, handheld devices, or any other computing system or device. In a basic configuration, computing system 302 can include at least one processing unit 312 and a system (main) memory 314.

Processing unit 312 can comprise any type or form of processing unit capable of processing data or interpreting and executing instructions. The processing unit 312 can be a single processor configuration in some embodiments, and in other embodiments can be a multi-processor architecture comprising one or more computer processors. In some embodiments, processing unit 312 can receive instructions from program and data modules 330. These instructions can cause processing unit 312 to perform operations in accordance with the present disclosure.

System memory 314 (sometimes referred to as main memory) can be any type or form of volatile or non-volatile storage device or medium capable of storing data and/or other computer-readable instructions. Examples of system memory 314 include, for example, random access memory (RAM), read only memory (ROM), flash memory, or any other suitable memory device. In some embodiments computing system 302 can include both a volatile memory unit (such as, for example, system memory 314) and a non-volatile storage device (e.g., data storage 316, 346).

In some embodiments, computing system 302 can also include one or more components or elements in addition to processing unit 312 and system memory 314. For example, as illustrated in FIG. 3, computing system 302 can include internal data storage 316, a communication interface 320, and an I/O interface 322 interconnected via a system bus 324. System bus 324 can include any type or form of infrastructure capable of facilitating communication between one or more components comprising computing system 302. Examples of system bus 324 include, for example, a communication bus (such as an ISA, PCI, PCIe, or similar bus) and a network.

Internal data storage 316 can comprise non-transitory computer-readable storage media to provide nonvolatile storage of data, data structures, computer-executable instructions, and so forth to operate computing system 302 in accordance with the present disclosure. For instance, the internal data storage 316 can store various program and data modules 330, including for example, operating system 332, one or more application programs 334, program data 336, and other program/system modules 338. In some embodiments, for example, the internal data storage 316 can store one or more of the sequencer module 104, and the log manager module 106 shown in FIG. 1, which can then be loaded into system memory 314. In some embodiments, internal data storage 316 can serve as the shared log 102.

Communication interface 320 can include any type or form of communication device or adapter capable of facilitating communication between computing system 302 and one or more additional devices. For example, in some embodiments communication interface 320 can facilitate communication between computing system 302 and a private or public network including additional computing systems. Examples of communication interface 320 include, for example, a wired network interface (such as a network interface card), a wireless network interface (such as a wireless network interface card), a modem, and any other suitable interface.

In some embodiments, communication interface 320 can also represent a host adapter configured to facilitate communication between computing system 302 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 302 can also include at least one output device 342 (e.g., a display) coupled to system bus 324 via I/O interface 322. The output device 342 can include any type or form of device capable of visual and/or audio presentation of information received from I/O interface 322.

Computing system 302 can also include at least one input device 344 coupled to system bus 324 via I/O interface 322. Input device 344 can include any type or form of input device capable of providing input, either computer or human generated, to computing system 302. Examples of input device 344 include, for example, a keyboard, a pointing device, a speech recognition device, or any other input device.

Computing system 302 can also include external data storage 346 coupled to system bus 324. In some embodiments, external data storage 346 can provide a storage cluster (e.g., 40, FIG. 4) for the shared log 102. In some embodiments, for example, the external data storage 346 can comprise storage units with both server-attached SATA SSDs (a pair of SSDs attached to a server accepting network commands), and also networked-attached flash with a custom FPGA implementation (server functionality and network protocols entirely in hardware).

Figure 4:
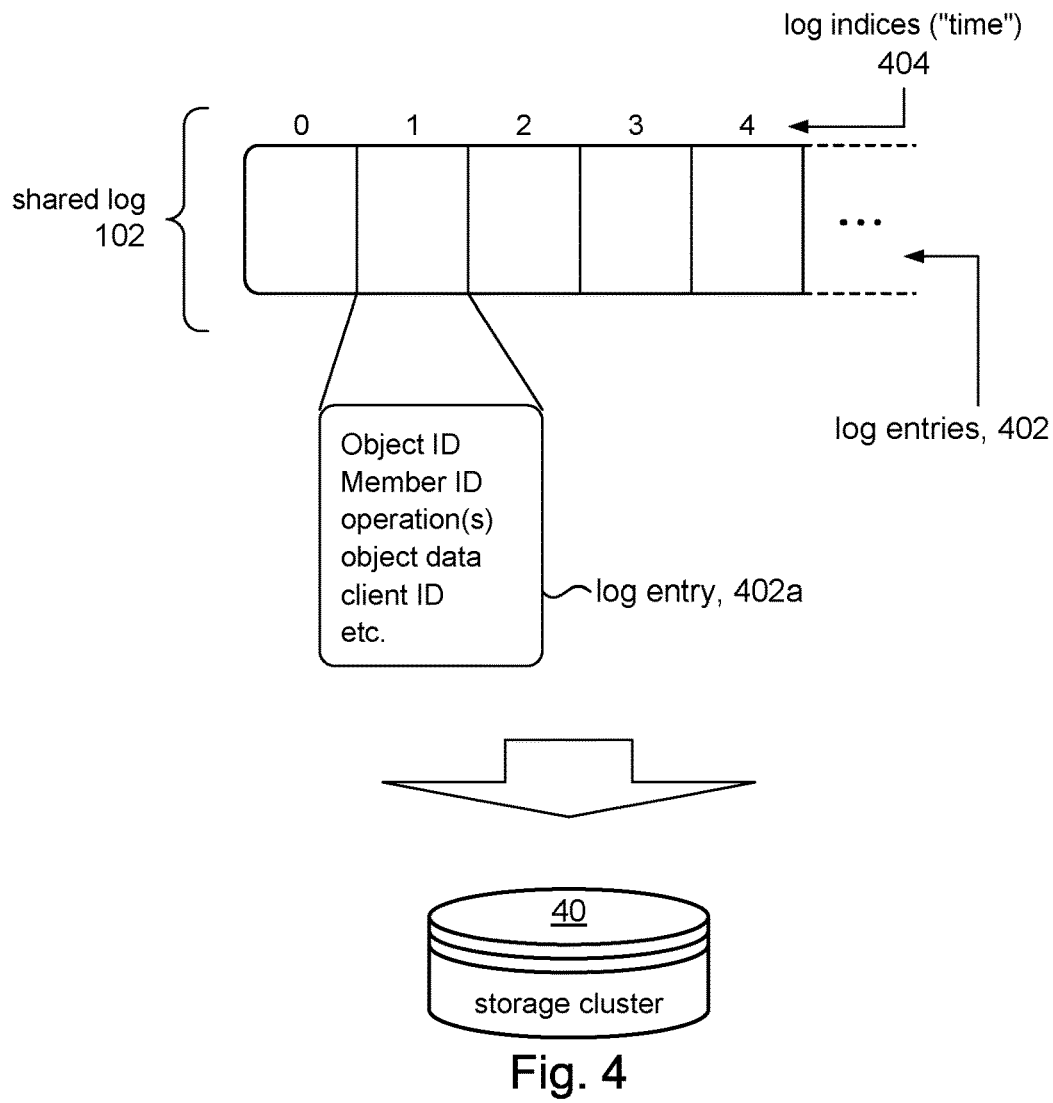
FIG. 4 shows a simplified representation of a shared log.

FIG. 4 shows a simplified representation of a shared log 102 in accordance with the present disclosure. In some embodiments, for example, the shared log 102 can be built on top a distributed storage system (e.g., storage cluster 40). The shared log 102 can comprise a set of log entries 402, one such entry for each transaction. Each log entry 402a can map to one or more pages of storage on the storage cluster 40 and store the details of its corresponding transaction, including an object identifier that identifies the target object of the transaction, a member identifier that identifies the object member in the target object, current values of the objects, operations specified in the transaction, any data associated with the operations, an identifier of the client 12 that requested the transaction, and so on. A log entry 402a can store multiple target objects if the transaction updates multiple target objects.

Each log entry 402 can be identified by a log index (offset) 404 that represents its ordinal position in the shared log 102. Since log entries 402 are sequentially appended, the log index 404 can represent the "time" of a log entry 402 relative to other log entries in the shared log 102. For example, a log entry 402 having a log index of n occurs earlier in time than a log entry having a log index of n+1, and later in time than a log entry having a log index of n−1. The log index 404 can be referred to variously as an offset, an address, sequence number, version number, timestamp, time reference, and so on. The remainder of the present disclosure can use these various terms interchangeably.

Figure 5:
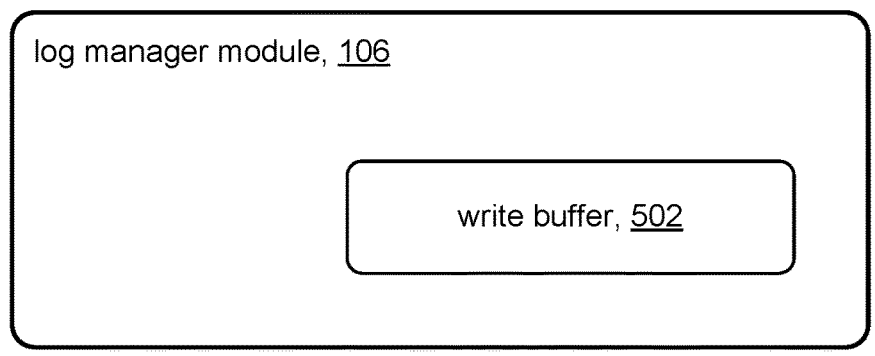
FIG. 5 shows a simplified representation of data that can be used in some embodiments of a log manager module in accordance with the present disclosure.

FIG. 5 shows s simplified representation of data that can be used by the log manager module 106. In some embodiments, for example, the log manager module 106 can include a transaction write buffer 502. The transaction write buffer 502 can serve as an intermediate area to hold a transaction received from a client 12 before the transaction is written to the shared log 102. In some embodiments, for example, the transaction write buffer 502 can provide a caching function.

Figure 6:
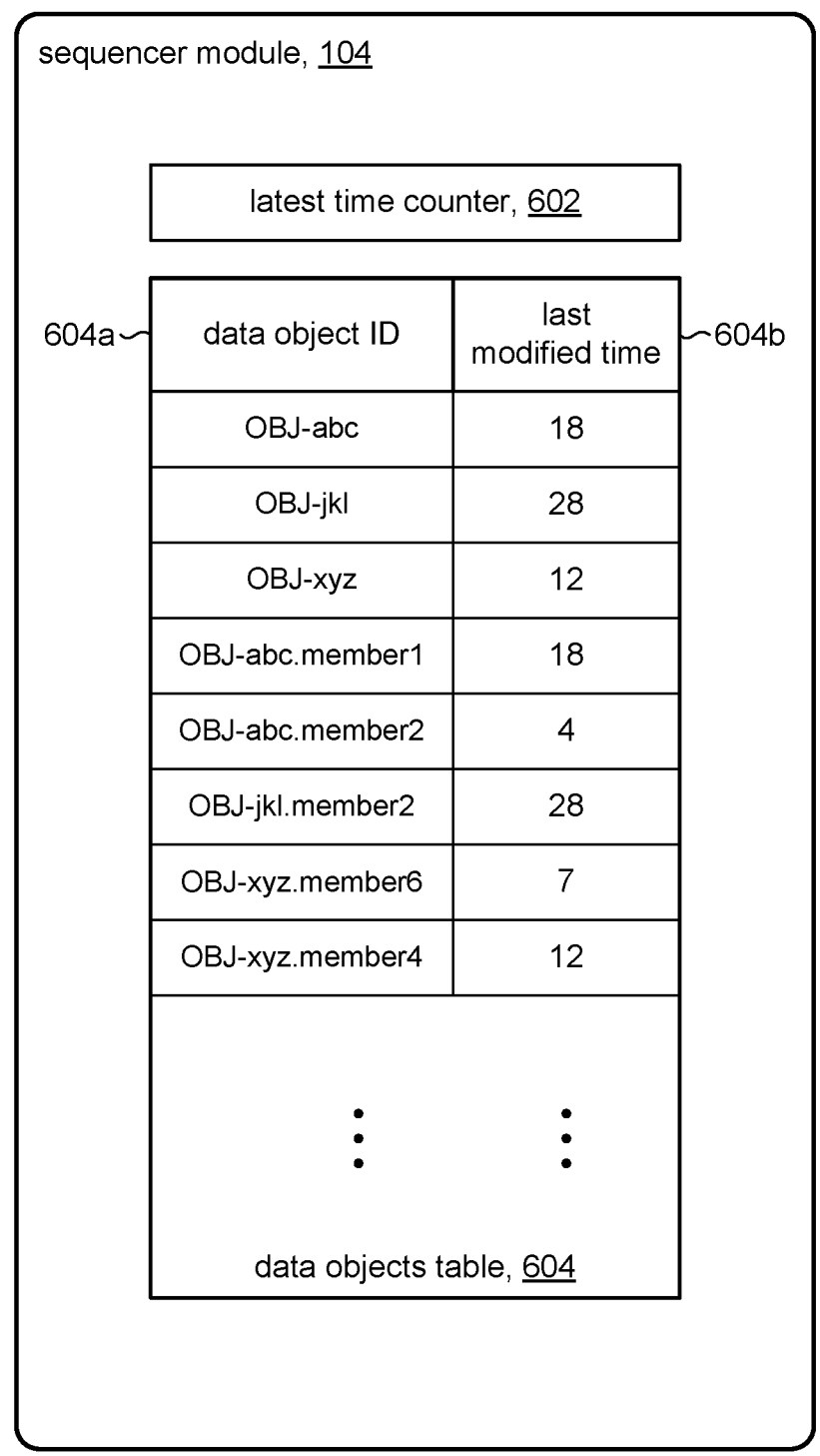
FIG. 6 shows a simplified representation of data that can be used in some embodiments of a sequencer module in accordance with the present disclosure.

FIG. 6 shows a simplified representation of components in the sequencer module 104 to manage fine-grained conflict resolution in accordance with the present disclosure. The conflict resolution is "fine-grained" in that conflict resolution occurs at with respect to object members in structured objects rather than at the level of the objects themselves (course-grain). In some embodiments, the sequencer module 104 can include a time reference called the latest time counter 602, which can be an integer value of suitable size (e.g., a 64-bit value). The latest time counter 602 can represent a sense of time in the shared log system 100. In some embodiments, the latest time counter 602 can be the log index 404 of the most recent entry (the tail) in the shared log 102. The latest time counter 602 can be incremented each time a transaction is committed to the shared log 102.

The sequencer module 104 can include a data objects table 604 that stores information relating to each object member of each object 112 in the shared log system 100. As used herein, the term "data object" will refer to a particular object member of a particular object; although in some embodiments where object 112 does not comprise structured data, the term "data object" can refer to the entire object 112 such as disclosed in commonly owned U.S. application Ser. No. 15/652,981.

The data objects table 604 include information for each data object that can be collectively referred to as state information, metadata, and the like for that data object. The data objects table 604, for example, can include a column of data object identifiers 604a that identify the data objects in the shared log system 100. In some embodiments, for example, a data object identifier 604a can be formed by computing a hash value using a name (e.g., a text string) of the object and a name of the object member in that object. The computed hash values can be used to as an index to the data objects table 604.

The data objects table 604 can include a column of last-modified times that stores a last-modified time 604b for each data object. The last-modified time of a data object is a time reference (e.g., using the latest time counter 602) of when the data object was last updated/modified. In some embodiments, the last-modified time can be the log index 404 of the log entry 402 that contains the transaction for the data object. Merely to illustrate this point, FIG. 6 shows three objects OBJ-abc, OBJ-ghi, OBJ-xyz and respective members of those objects. For example, the data objects table 604 shows that "member1" of object OBJ-abc was last modified at time reference 18. In other words, 18 is the log index of the log entry that contains the transaction that last updated the data object OBJ-abc.member1. Likewise, for "member2" of object OBJ-abc (last modified at time reference 6) and "member2" of object OBJ-jkl (last modified at time reference 28).

In some embodiments, the data objects table 604 can include entries for the object s themselves. In some embodiments, for example, the last-modified time field 604b for the entire object can represent the time that any member of that object was last modified. FIG. 6, for example, shows that the entry for OBJ-abc has a last-modified time of 18 because its member member1 was last modified at that time.

Figure 7:
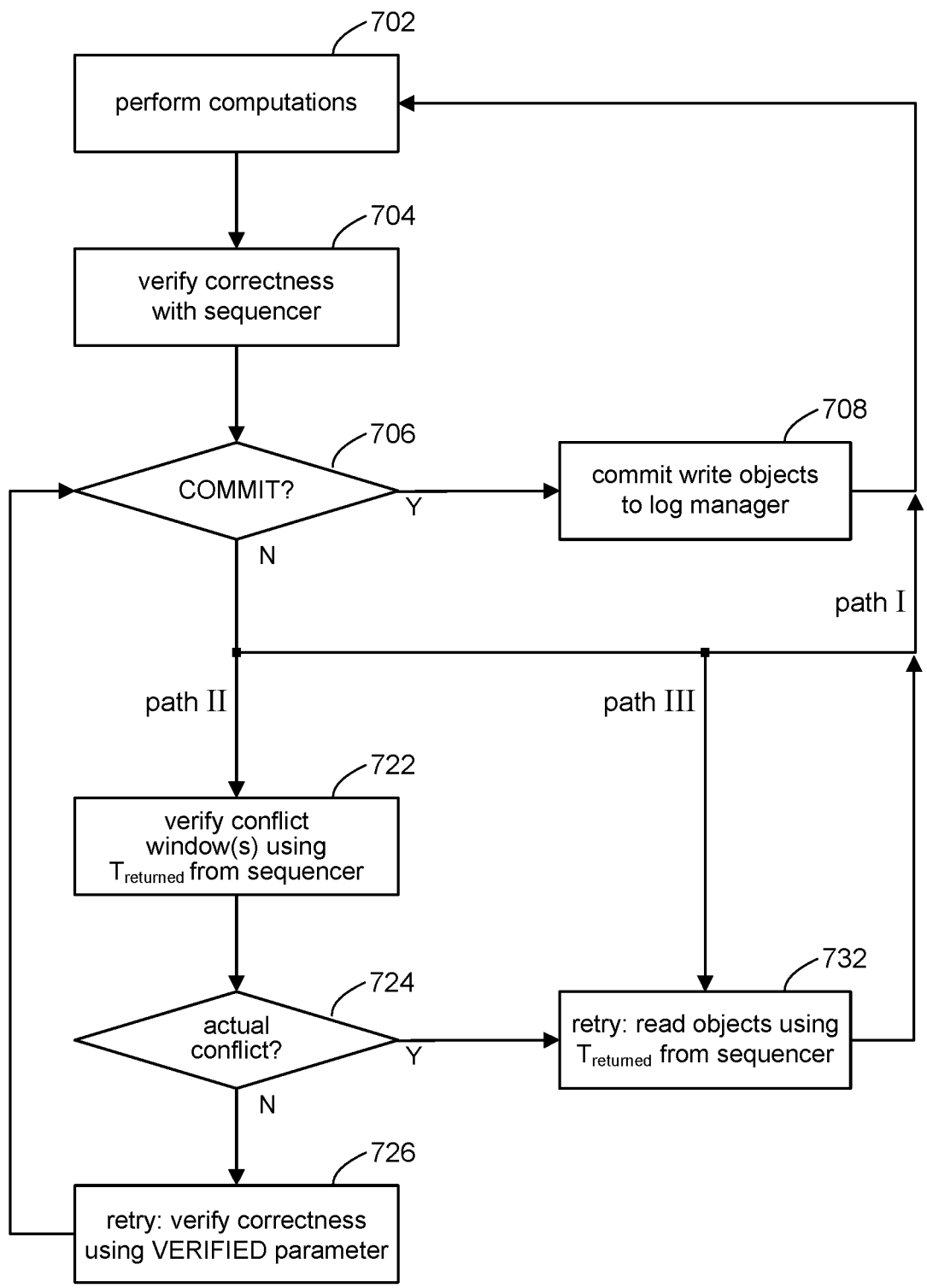
FIG. 7 depicts an operational flow in a client in accordance with the present disclosure.

The discussion will now turn to a description of various operational flows in the shared log system 100 for processing a transaction in accordance with the present disclosure, beginning with processing in a client. A basic flow in the shared log system 100 can begin with a client writing a transaction to the shared log 102. The client can obtain from the sequencer module 104 an offset into the shared log 102. The offset (e.g., log index 404) identifies a log entry 402 in the shared log into which the transaction can be stored. In accordance with the present disclosure, the sequencer module 104 can verify the correctness of the transaction before issuing an offset. Refer now to FIG. 7, in conjunction with the previous figures, for a high level operational flow in a client (e.g., 12a).

At operation 702, a client 12a can perform a series of operations and/or computations on one or more data objects in the shared log system 100 to produce data for a transaction (transaction result). The operations and/or computations that comprise the transaction can include a set of data objects that serve as the source of data for the transaction (call these the "source data objects"). The transaction can include a set of data objects that are to be modified with the results of the operations and/or computations (call these the "target data objects").

The source data objects can come from the client's local copy (e.g., virtual objects 14 stored in the client's memory) of the data, rather than from the shared log 102. Maintaining a local copy of the source data objects can reduce the processing overhead that can be incurred when having to access the shared log 102 for the data. Maintaining a local copy of the source data objects can become outdated if other client, however, incurs the risk that the source data objects are outdated due to other clients making updates to those data objects.

At operation 704, when the client 12a has completed its computations and is ready to submit a transaction to the shared log 102, the client 12a can communicate with the sequencer module 104 to obtain the log index 404 of the next free log entry in the shared log 102. In accordance with the present disclosure, the sequencer module 104 can verify the correctness of that transaction as a pre-condition of issuing the log index 404. Recall from FIG. 1 that each client stores a copy of data objects from the shared log 102 in their own virtual objects 14. Accordingly, computations made by client 12a using source data objects from its virtual objects 14 may be incorrect if the same source data objects have been subsequently updated by other clients; this is referred to as a "conflict." Verification of correctness in accordance with the present disclosure can be performed to determine whether a conflict exists or not. Accordingly, in some embodiments, the client 12a can send a verify request to the sequencer module 104 to verify whether there is a conflict in the transaction and obtain the next free log index. The verify request can include a set of identifiers (the "write set") for each of the target data objects to be updated, a set of identifiers (the "read set") for each of the source data objects, and a snapshot time. The "snapshot time" is a time reference that indicates the most recent data state of the source data objects as stored in the virtual objects 14 of client 12a.

In accordance with the present disclosure, the information load in the verify request that is provided to the sequencer module 104 can be kept to a minimum. In other words, the verify request can contain the minimum amount of information that the sequencer module 104 needs to do its job. For example, parameters for the verify request can comprise only identifiers of the target data objects and identifiers of the source data objects. In some embodiments, for example, the client 12a can compute hash values (e.g., 8-byte values) as identifiers of the target and source data objects. For instance hash values can be computed using the text string of the name of the object and of the name of the member in that object. An 8-byte hash value of a data object can be much more compact than a lengthy textual identifier of the data object.

Since verification in accordance with the present disclosure does not require the actual data associated with the source and target data objects, the verify request can omit such data. Likewise, the verify request can omit the operations and/or computations used to compute the data for the target data objects, further reducing the overhead in communicating with the sequencer module 104. These can be important considerations because all clients 12 in the system 10 go through the sequencer module 104 to verify the correctness of their respective transactions, and so the application programming interface (API) to the sequencer module 104 should be kept as "lightweight" as possible by omitting any extraneous information in the verify request API to minimize communication overhead with the sequencer module 104.

For illustrative purposes only, an example of a verify request can include the following parameters:
source data objects in read set:
A.member1 (i.e., object A and object member member1)
A.member3
B.member1
target data objects in write set:
A.member6
C.member5
C.member9
snapshot time: 15

This example illustrates various points. The transaction read set (source data objects) can comprise more than one data object to make the computation. The transaction write set can target several data objects; e.g., different members in different objects, different members within the same object, different members in one of the source objects (e.g., a member in object A can be a source data object and a different member in object A can be a target data object), and so on.

In accordance with some embodiments, the verify request can include only a single snapshot time (in keeping with the goal of achieving a lightweight interface to the sequencer module 104), despite that the read set can comprise several data objects. In some embodiments, the snapshot time can be the time reference of the source data object that was most recently updated. Recall that each client maintains its own virtual copy of data objects. Accordingly, each client will maintain its own time references for when those data objects were most recently updated. Using the example above, for instance, suppose the virtual objects 14 in client 12a includes the following state information for the read set:
A.member1—most recently updated at time reference 12
A.member3—most recently updated at time reference 15
B.member1—most recently updated at time reference 11
Client 12a would use time reference 15 as the snapshot time in the verify request (as shown in the example above) because A.member3 is the most recently updated data object among the source data objects stored among the virtual objects 14 of client 12a.

At operation 706, the client 12a can receive a response to the verify request indicating whether the transaction can be committed (COMMIT) or should be aborted (FAIL). For example, in response to the client 12a receiving a COMMIT from the sequencer module 104, processing in the client 12a can proceed to operation 708 to commit the transaction. On the other hand, in response to the client 12a receiving a negative response (e.g., FAIL), the client 12a can proceed along processing paths I, II, III explained below.

At operation 708, the client 12a can respond to a COMMIT from the sequencer module 104. A COMMIT response indicates that the data states of the source data objects as stored in the client 12a matches the sequencer module's data states of the same source data objects. Accordingly, the computation can be deemed to be correct with respect to those source data objects. In addition to receiving a COMMIT from the sequencer module 104, the client 12a can receive the value of the latest time counter 602 from the sequencer module 104, which identifies the log index 404 of the next free log entry 402 in the shared log 102.

In response to receiving a COMMIT from the sequencer module 104, the client 12a can commit the transaction. In some embodiments, for example, the client 12a can submit a write transaction to the log manager module 106 to update the target data objects. The write transaction can include the value of the latest time counter 602, which identifies the log entry 402 in the shared log 102 to store the transaction. Client 12a can send a message to the log manager module 106 to buffer the transaction in the log manager module's transaction write buffer 502 to be written to the shared log 102. The value of the latest time counter 602 from the sequencer module 104 can also be used to update the local time references of the target data objects stored in the client 12a. Processing can return to operation 702 to process another transaction.

Returning to operation 706, the client 12a in the alternative can receive a FAIL response from the sequencer module 104. In some instances, a FAIL response can indicate that not all the source data objects used to make the computations for the transaction were at their latest data state; in other words, there was a conflict between the data state of at least one of the source data objects in the client 12a versus the data state of that source data object in the shared log 102. Consequently, the computations performed by client 12a may be incorrect. This is an example of an "actual conflict."

In other instances, a FAIL response can indicate a failure in the sequencer module 104, whereby access to state information (e.g., last-modified time 604b, FIG. 6) for one or more of the source data objects identified in the verify request is not possible or available. This is an example of false indication of a conflict (a "non-conflict"). This aspect of the present disclosure is discussed in more detail below.

In response to receiving a FAIL from the sequencer module 104, the client 12a in some embodiments can proceed along any one of three processing paths I, II, III. The client 12a does not know whether the FAIL is due to an actual conflict or is a non-conflict failure in the sequencer module 104 (e.g., a collision in the hash function used to generate object identifiers). Accordingly, in some instances, the client 12a can abort the transaction and return to operation 702 to process another transaction (processing path I). In other instances, the client 12a can proceed to operation 722 (processing path II) or to operation 732 (processing path III) and attempt to retry the verification. Processing paths II and III are discussed next.

Processing Path II

At operation 722, the client 12a can respond to the FAIL indication by scanning entries in the shared log 102, and manually determining whether or not an actual conflict exists. In some embodiments, the sequencer module 104 can return a time reference $T_{returned}$ to the client 12a along with the FAIL indication. Depending on the nature of the FAIL condition, $T_{returned}$ can be the log index 404 of the log entry 402 in the shared log 102 of the source data object, among all the source data objects in the read set, that was most recently updated (in the case of an actual conflict). In the case of a non-conflict failure in the sequencer module 104, $T_{returned}$ can be the value of the latest time counter 602 (i.e., the log index 404 of the log entry 402 at the tail of the shared log 102).

In accordance with some embodiments, the client 12a can scan the shared log 102 for each source data object for any updates made within a conflict window, to determine whether or not an actual conflict exists. In some embodiments, the "conflict window" for a data object can be defined as the window of time between $T_{returned}$ (the time reference returned by the sequencer module 104) and the client's time reference for that data object, keeping in mind that each client in the system maintains its own virtual copy of data objects and corresponding time references. Using the examples above, for instance, the conflict window for the data object A.member1 is the time between time reference 12 (the client side time reference) and $T_{returned}$. The conflict window for the data object A.member3 is the time between time reference 15 and $T_{returned}$, and for the data object B.member1 the conflict window is between time reference 11 and $T_{returned}$.

Consider the scanning for data object A.member1, for example. In some embodiments, the client 12a can query the shared log 102, for each increment in time within the conflict window (from time reference 12 to $T_{returned}$) to look for any updates to A.member1. Thus, client 12a can query the shared log 102 for any updates to A.member1 made at time reference 13 (e.g., read the log entry at log index=13), then at time reference 14, and so on up to $T_{returned}$. If an update has been made to data object A.member1 at any time between 12 and $T_{returned}$, then an actual conflict of data object A.member1 exists; in other words, the copy of A.member1 held by client 12a is older than the current state of A.member1 in the shared log 102. Otherwise, there is no actual conflict with A.member1.

At operation 724, in response to detecting an actual conflict with any one of the source data objects, client 12a can proceed to operation 732. If no actual conflict is detected, processing in the client 12a can proceed to operation 726.

At operation 726, the client 12a can retry verifying the transaction and obtaining a log index when no actual conflict exists. In accordance with the present disclosure, the client 12a can include an additional parameter, referred to herein as a VERIFIED flag, in the verify request. The VERIFIED flag can serve to indicate to the sequencer module 104 that the client 12a has verified that the source data objects are not in conflict with the shared log 102 as of time reference $T_{returned}$. Accordingly, the client 12a can use the time reference $T_{returned}$ as the snapshot time parameter in the verify request.

Since a source data object can be updated by another client subsequent to verifying the conflict windows (operation 722) and prior to receiving confirmation from the sequencer module 104 to commit the transaction, the sequencer module 104 may respond with another FAIL indication. Accordingly, processing in the client 12a can continue at operation 706 to repeat the process.

Processing Path III

At operation 732, the client 12a can respond to the FAIL indication by re-computing the transaction. In accordance with some embodiments, the client 12a can use the time reference $T_{returned}$ returned by the sequencer module 104 to obtain the latest data state of the source data objects used in computing the transaction. For example, using $T_{returned}$, the client 12a can replay transactions from the shared log 102 up to $T_{returned}$ for each data object, thus updating the data state of the source data objects to the time reference of $T_{returned}$. The client 12a can then recompute the transaction beginning at operation 702 with the updated source data objects.

The discussion will now turn to a description of additional detail in the sequencer module 104 in accordance with some embodiments. As noted above, the sequencer module 104 can indicate FAIL as a result of an actual conflict, where the data state in the shared log 102 of a source data object is more current than the data state in the client. In some embodiments, for example, an actual conflict can exist when the log index 404 of the most recent entry 402 of a source data object in the shared log 102 is greater than the time reference for that source data object in the client.

It is further noted that the sequencer module 104 can indicate FAIL where there is no actual conflict (a non-conflict). In some embodiments, a non-conflict FAIL can arise if the data objects table 604 does not contain an entry for a source data object. In some embodiments, for example, it may not be practical to store the entire data objects table 604 in main memory. In specific instances, for example, the data objects table 604 can contain thousands to hundreds of thousands to millions of entries. Accordingly, only portions of the data objects table 604 may be stored in main memory, for example, in a cache. Being a cache memory, portions of the cache can be evicted from main memory, for example, due to memory pressure, or during the course of normal memory management in the computer system (e.g., 302, FIG. 3), and so on. It is therefore possible that information for a source data object of a verify request is in a part of the data objects table 604 that is not presently cached in main memory, in which case the sequencer module 104 can indicate a FAIL.

In some embodiments, a non-conflict FAIL can arise due to a hash collision. As noted above, in some embodiments, a data object in the data objects table 604 can be indexed according to a hash value (hash code) computed from the identifier of the object and the identifier of the member in that object. Clients can transmit hash codes to identify data objects in the read set and data objects in the write set in order to minimize I/O with the sequencer module 104. In the case of a hash collision for a data object, the sequencer module 104 can respond with a FAIL because the data object cannot be identified due to the collision.

Figure 8:
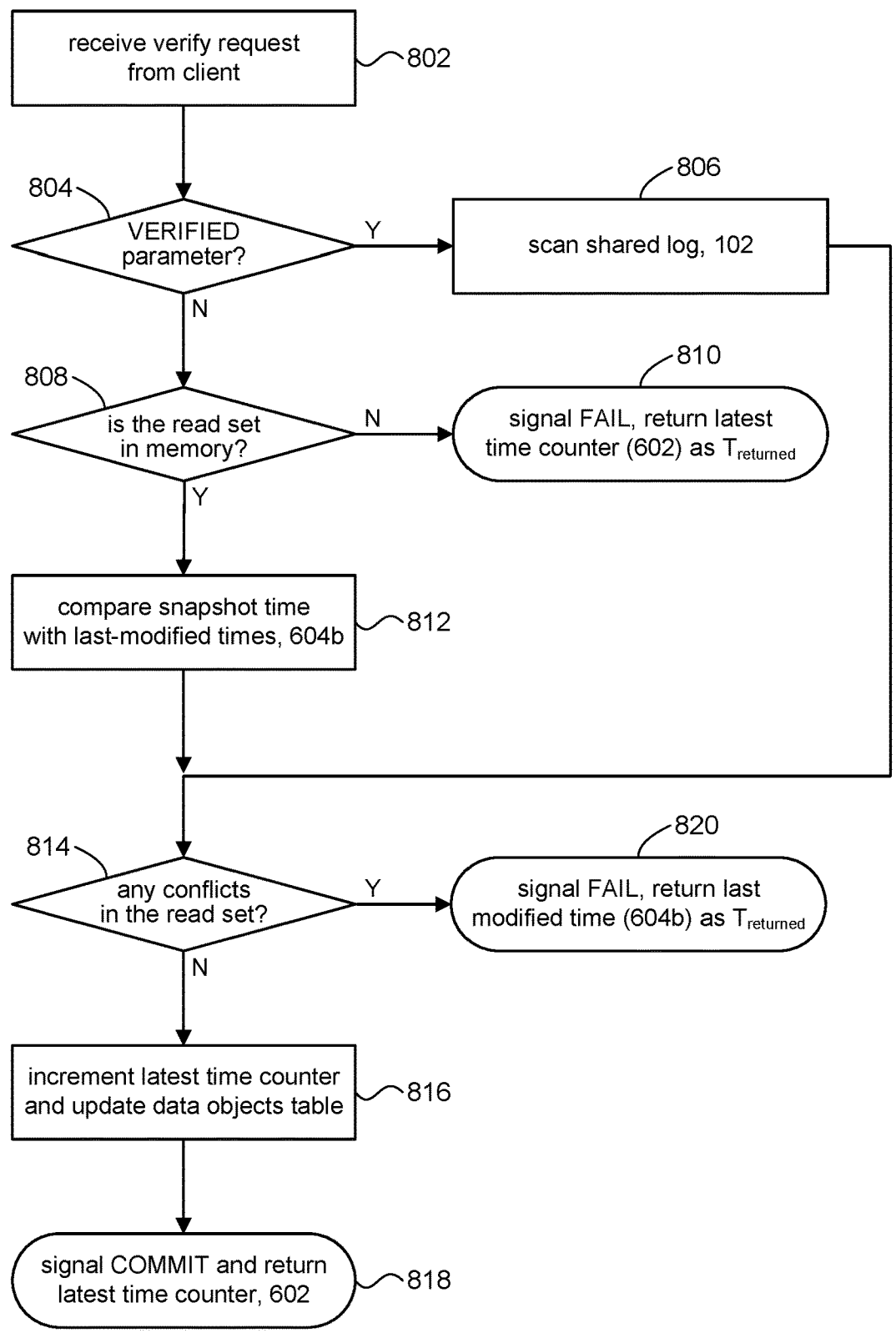
FIG. 8 depicts an operational flow in a sequencer module in accordance with the present disclosure.

Referring to FIG. 8, the discussion will now turn to a description of processing in the sequencer module 104 in accordance with some embodiments of the present disclosure. FIG. 8, in conjunction with previous figures, shows a high level operational flow in the sequencer module 104 for verifying the correctness of a transaction in accordance with the present disclosure. In some embodiments, for example, the sequencer module 104 can include computer executable program code, which when executed by a computer system (e.g., 302, FIG. 3), can cause the computer system to perform processing in accordance with FIG. 8. The operation and processing blocks described below are not necessarily executed in the order shown, and can be allocated for execution among one ore more concurrently executing processes and/or threads.

At operation 802, the sequencer module 104 can receive a verify request from a client (see operations 704, 726, FIG. 7, for example). As explained above, the verify request can include identifiers of data objects in the read set (source data objects) and data objects in the write set (target data objects) of the verify request, and a snapshot time. The client can provide any suitable time reference as the snapshot time. For example, the client can provide a snapshot time that it believes represents the latest state of the data in the source data objects. As noted above, the verify request does not include (nor does it require) the data or operations used to compute the transaction. In this way, the sequencer module 104 can be quickly invoked and executed (lightweight process).

At operation 804, the sequencer module 104 can determine if the verify request includes the VERIFIED parameter (see operation 726, FIG. 7). As explained above, this parameter can be used when the client receives a FAIL from the sequencer module 104. The parameter can serve to indicate that the client has manually verified the source data objects up to the time indicated by the snapshot time (operation 726). In response to the verify request having a VERIFIED parameter, the sequencer module 104 can proceed to operation 806; otherwise, the sequencer module can proceed to operation 808.

At operation 806, the sequencer module 104 can verify each source data object by scanning the shared log 102. As explained above, inclusion of the VERIFIED parameter in the verify request indicates the client has manually verified the data objects up to the snapshot time provided in the verify request in response to a FAIL indication. Accordingly, the sequencer module 104 needs only to scan that portion of the shared log 102 from the time of the snapshot time to the latest entry in the shared log 102 (e.g., pointed to by the latest time counter 602) to verify the source data objects, instead of having to scan the entire shared log 102. If none of the data objects appear in the shared log 102 subsequent to the snapshot time, the data objects can be deemed to be verified; i.e., no conflict. If one of the data objects appears in shared log 102 subsequent to the snapshot time, this can be deemed to be a conflict. The sequencer module 104 can proceed to operation 814.

At operation 808, the sequencer module 104 can determine if all the source data objects are in memory. As explained above, only portions of the data objects table 604 may be cached in main memory. As such, it is possible that portion(s) of the data objects table 604 that contain one or more of the source data objects may not be in main memory. Accordingly, in response to a determination that one or more of the source data objects are not in main memory, the sequencer module 104 can proceed to operation 810; otherwise, the sequencer module 104 can proceed to operation 812.

At operation 810, the sequencer module 104 can signal a FAIL to the client since the portion(s) of the data objects table 604 that contains one or more source data objects are not in main memory. As such, the sequencer module 104 does not have the last-modified times (604b, FIG. 6) for those data objects, and cannot determine if they are current with respect to the snapshot time provided in the verify request. The sequencer module 104 can return a value for $T_{returned}$ to the client. In this situation, the value for $T_{returned}$ can be the time reference of the latest entry in the shared log 102; for example, the sequencer module 104 can return the value of the latest time counter 602 as $T_{returned}$. Since the sequencer module 104 does not have state information for one or more of the source data objects, the client can rescan a portion of the shared log 102 using $T_{returned}$ to manually determine if a conflict exists (see N branch of operation 706, FIG. 7). This shifting of the rescanning process from the sequencer module 104 to the clients reduces the burden of rescanning in the sequencer module 104 to enable efficient processing of verify requests from other clients as a lightweight process. Accordingly, the sequencer module 104 can return to operation 802 to process the next verify request.

At operation 812, the sequencer module 104 can verify the actual state of the source data objects against the snapshot time provided in the verify request, for example, by comparing the snapshot time to time references of the source data objects' most recent updates in the shared log 102 to determine whether the snapshot time represents the most current data state of the source data objects. In some embodiments, for instance, the sequencer modules 104 can compare the last-modified time 604b of each source data object in the data objects table 604 against the snapshot time received in the verify request.

A data object is deemed to be "verified" if its last-modified time 604b is less than or equal to the snapshot time; in other words, when the snapshot time is not earlier in time than any of the data object's most recent update. Stated differently, a data object is deemed to be verified if the snapshot time represents the most current data state of the data object.

Conversely, if the last-modified time 604b of the data object is greater than the snapshot time, then that data object can be deemed to be at a state that is more recent than indicated by the snapshot time; in other words, there is a conflict. Stated differently, a conflict can exist when the most current data state of the data object occurs later in time than the snapshot time.

In accordance with the present disclosure, the sequencer module 104 can consider the last-modified times of the object members of an object, rather than the last-modified time of the object itself. Recall that a data object refers to an object (source object) and an object member (source object members) in that object; e.g., a record 202 in database table 200 in FIG. 2 can be viewed as an object, and the data fields 204 can be viewed as object members. A source data object can be deemed verified with respect to the snapshot time, even though other members in that object may have been updated later than the snapshot time. Consider the transaction example discussed above in FIG. 7:

source data objects in read set:
A.member1 (i.e., object A and object member member1)
A.member3
B.member1
target data objects in write set:
A.member6
C.member5
C.member9
snapshot time: 15

If an object member called member2 in object A was updated at time reference 16, the source data objects comprising the read set are still deemed verified because A.member2 is not part of the read set, even though the most current data state of A.member2 occurs later in time than the snapshot time. By comparison, if object A itself was the basis for verification, then verification of the read set can fail because object A would have an update time no earlier than time reference 16, which is subsequent to the snapshot time.

At operation 814, if no conflicts were detected in operation 812 (or operation 806), then the computations/operations made using the source data objects can be deemed to be "correct" and the sequencer module 104 can continue processing at operation 816. On the other hand, if at least one conflict was detected in operation 812 (or operation 806), then whatever computations were made using the source data objects can be deemed to be "incorrect" and the sequencer module 104 can process a FAIL at operation 820.

Figure 9:
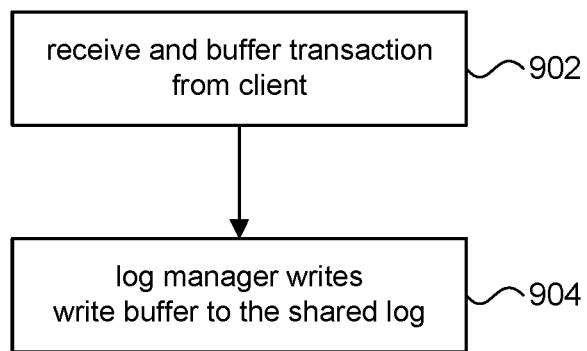
FIG. 9 depicts an operational flow in a log manager module in accordance with the present disclosure.

At operation 816, the sequencer module 104 has determined that the transaction is "correct" in terms of the data objects used to compute the transaction, and can allow the transaction to be committed. In accordance with some embodiments of the present disclosure, for example, the sequencer module 104 can increment the latest time counter 602 to point to the next (new) free entry in the shared log 102 in which the transaction will be stored (FIG. 9).

The sequencer module 104 can update the data objects table 604 with respect to the target data objects. For example, the sequencer module 104 can find one or more entries in the data objects table 604 that contain that target data objects. If a target data object is not already in the data objects table 604, the sequencer module 104 can create a new entry. For each target data object in the data objects table 604, the sequencer module 104 can update its last-modified time field 604b with the value of the latest time counter 602 to indicate the log entry 402 in the shared log 102 that contains the operation(s) applied to the target data objects. The data objects table 604, therefore, provides information (e.g., via the last-modified time field 604a) of the latest updates to data objects in the shared log 102.

At operation 818, the sequencer module 104 can signal the client to COMMIT the transaction. The sequencer module 104 can also provide the latest time counter 602 (see operation 708, FIG. 7) to the client. This allows the client to update the last modified times of its local copy of the target data objects.

At operation 820, the sequencer module 104 can signal a FAIL to the client in response to detecting a conflict, where the client can retry sending the verify request (see N branch of operation 706, FIG. 7). The sequencer module 104 can return a value for $T_{returned}$ to the client. In this situation, the value for $T_{returned}$ can be the time reference of the source data object in the read set that was most recently updated, rather than using the most recent log entry 402 in the shared log 102 (operation 810). For example, the sequencer module 104 can scan the data objects table 604 and return the largest value of the last-modified time 604b among the source data objects as $T_{returned}$. As explained above, shifting the rescanning process from the sequencer module 104 to the clients keeps the sequencer module a lightweight process so that it can quickly process verify requests from other clients in the system. Accordingly, the sequencer module 104 can return to operation 802 to process the next verify request.

As noted above, processing in accordance with the present disclosure allows the client to verify correctness of the transaction in a single roundtrip message, without having to employ time consuming heavyweight mechanisms such as locking, write-logging, and the like. Processing by the sequencer module 104 is efficient; it needs only to maintain a counter (last-modified time) per data object, and do simple in-memory comparisons to assess correctness of the transaction without the need for the source data objects or the operations and/or computations of the transaction. This lightweight interface to the sequencer module 104 allows clients in the shared log system 100 to quickly access the sequencer module 104. The lightweight processing in the sequencer module 104 allows all clients to perform conflict resolution with greatly reduced loading on the system as compared to conventional approaches.

FIG. 9, in conjunction with the previous figures, shows a high level operational flow in the log manager module 106 for committing a transaction in accordance with the present disclosure. In some embodiments, for example, the log manager module 106 can include computer executable program code, which when executed by a computer system (e.g., 302, FIG. 3), can cause the computer system to perform processing in accordance with FIG. 9.

At operation 902, the log manager module 106 can receive a transaction from a client 12 (see operation 708, FIG. 7, for example) to be committed to the shared log 102. The transaction can include the log index (provided by the sequencer module 104, operation 816) of the log entry 402 in the shared log 102 to store the transaction. The received transaction can include one or more target data objects to be written. Each target data object can include, among other things, an object identifier, an identifier of a member in the object, the data associated with the transaction, and so on. The log manager module 106 can buffer the received transaction in its transaction write buffer 502.

At operation 904, the log manager module 106 can write the received transaction stored in the transaction write buffer 502 to the shared log 102. In some embodiments, for example, the log manager module 106 can allocate space for another log entry 402 in the shared log 102 to store the target data objects. The write buffer 502 can retain the target data objects for subsequent read operations on the target data objects, and thus act as a caching mechanism.

The present disclosure will now turn to a discussion of accessing the most recent update to a data object stored in a shared log 102. Conventionally, a client 12 can generate the latest state of a data object by replaying all the transactions made to that object from the time of its instantiation. The idea of "replay" is a well known and understood concept. Briefly, to replay a given object the client 12 issues individual read operations to offsets in the shared log 102 to access log entries 402 for transactions made to the object of interest. The client 12 serially applies those transactions to the object starting from the time of the object's instantiation. It can be appreciated that replaying the shared log 102 can greatly increase latency, especially when the client 12 is just interested in a single update. Some systems improve on this brute force approach by separating the log into per-object streams. However, this alternative still requires playback of a "stream," which although smaller than the log, still can contain many updates that the client may not be interested in but has to replay in order to access the most recent update.

Figure 10:
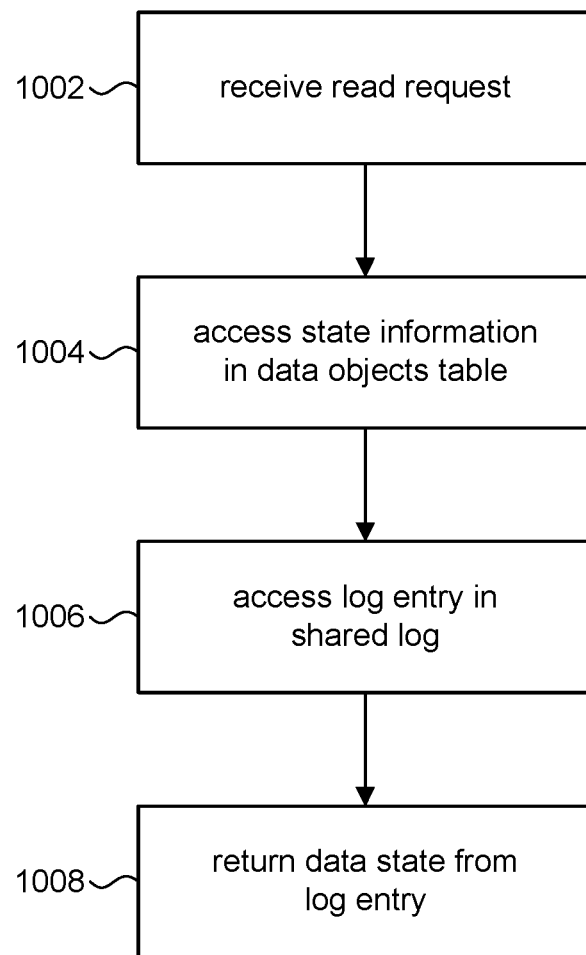
FIG. 10 depicts an operational flow for processing a read request in accordance with the present disclosure.

FIG. 10, in conjunction with previous figures, shows a high level operational flow in the computer system 302 for accessing the most recent update of a data object in accordance with the present disclosure. In some embodiments, for example, the computer system 302 can include computer executable program code, which when executed by a processing unit (e.g., 312, FIG. 3), can cause the processing unit to perform operations in accordance with FIG. 10. The operation and processing blocks described below are not necessarily executed in the order shown, and can be allocated for execution among one ore more concurrently executing processes and/or threads.

At operation 1002, the computer system 302 can receive a read request from a client to access the most recent data state of a (target) data object. The read request can include an identifier that identifies the target data object. In some embodiments, the identifier can be a hash value computed by the client using a name (e.g., a text string) of the object and a name of the object member in that object that constitute the target data object.

At operation 1004, the computer system 302 can use the identifier of the target data object to access an entry in the data objects table 604 corresponding to the target object. In some embodiments, for example, the hash value that identifies the target data object can be used to index into the data objects table 604.

At operation 1006, the computer system 302 can access a log entry 402 in the shared log 102. In some embodiments, for example, the last-modified time 604b of the entry in the data objects table 604 that corresponds to the target data object can be used as a log index 404 into the shared log 102 to access the log entry 402. A transaction stored in the accessed log entry 402 can include the most recent operations performed on the target data object and thus represents the most recent update made to the target data object.

At operation 1008, the computer system 302 can provide information relating to the most current data state of the target object to the client. Processing in the sequencer module 104 can continue at operation 1002 to process the next read request.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a shared log system, the method comprising:
    receiving, by a computer system, a request from a client machine to verify a transaction generated using one or more object members (source data objects) of a source object, the request comprising identifiers of the source data objects, and further comprising a snapshot time that represents a data state of the source data objects that were used to generate the transaction;
    comparing, by the computer system, the snapshot time to time references of the source data objects' most recent updates in the shared log to determine whether the snapshot time represents a most current data state of the source data objects; and
    causing, by the computer system, the transaction to be committed to the shared log in response to a determination that the snapshot time represents the most current data state of the source data objects, wherein the committing includes allocating a next free entry in the shared log to store the transaction, including:
        communicating the client machine to commit the transaction to the shared log; and
        sending to the client machine an index of the next free entry, wherein the client machine commits the transaction to the shared log by sending the transaction and the index to a log manager module, thereby reducing processing burdens on the client machine when performing conflict resolution so as to allow the shared log system to scale up.

2. The method of claim 1, wherein the source object comprises additional object members other than the source data objects, wherein the most current data states of the additional object members occur later in time than the snapshot time.

3. The method of claim 1, wherein the snapshot time represents the most current data state of the source data objects when the snapshot time is not earlier in time than any of the source data objects' most recent updates.

4. The method of claim 1, wherein each of the source data objects is associated with a corresponding last-modified time that represents a time of last modification of that source data object, the method further comprising comparing the snapshot time with the last-modified time of each of the source data objects to determine whether the snapshot time represents a most current data state of the source data objects.

5. The method of claim 4, wherein the snapshot time represents the most current data state of a source data objects when the snapshot time is greater than or equal to the last-modified time of each of the source data objects.

6. The method of claim 1, wherein the transaction further comprises a target object and one or more object members (target data objects) of the target object, the request further comprising identifiers of the target data objects, the method further comprising associating the index of the next free entry in the shared log with each of the target data objects as a time reference indicative of their most recent updates.

7. The method of claim 1, further comprising the computer system:
receiving the request to verify a transaction from a client machine;
signaling a FAIL indication to the client machine in response to a determination that the snapshot time does not represent the most current data state of the source data objects; and
sending to the client machine a time reference $T_{return}$ that represents the time reference of a source data object that was most recently updated among all the source data objects.

8. The method of claim 7, wherein the client machine accesses the shared log to determine whether any of the source data objects have been updated between the snapshot time and the time reference $T_{return}$.

9. The method of claim 1, wherein the request to verify a transaction further includes a VERIFIED parameter, the method further comprising in response to inclusion of the VERIFIED parameter scanning the shared log between the snapshot time and the most current entry in the shared log and causing the transaction to be committed to the shared log in response to a determination that the source data objects have not been updated between the snapshot time and the most current entry in the shared log, including allocating a next free entry in the shared log to store the transaction.

10. A non-transitory computer-readable storage medium having stored thereon computer executable instructions, which when executed by a computer system, cause the computer system to execute a first process to:
receive a request from a client machine to verify a transaction that comprises a source object and one or more object members (source data objects) of the source object, the request comprising identifiers of the source data objects, and further comprising a snapshot time that represents a data state of the source data objects used to produce a transaction result;
compare the snapshot time to time references of the source data objects' most recent updates in the shared log to determine whether the snapshot time represents a most current data state of the source data objects; and
allocate a next free entry in the shared log to store the transaction in response to a determination that the snapshot time represents the most current data state of the source data objects, including:
communicating the client machine to commit the transaction to the shared log; and
sending to the client machine an index of the next free entry, wherein the client machine commits the transaction to the shared log by sending the transaction and the index to a log manager module, thereby reducing processing burdens on the client machine when performing conflict resolution so as to allow the shared log system to scale up.

11. The non-transitory computer-readable storage medium of claim 10, wherein the source object comprises additional object members other than the source data objects, wherein the most current data states of the additional source data objects occur later in time than the snapshot time.

12. The non-transitory computer-readable storage medium of claim 10, wherein each of the source data objects is associated with a corresponding last-modified time that represents a time of last modification of that source data object, wherein the computer executable instructions, which when executed by the computer device, further cause the computer device to compare the snapshot time with the last-modified time of each of the source data objects to determine whether the snapshot time represents a most current data state of the source data objects.

13. The non-transitory computer-readable storage medium of claim 10, wherein the transaction further comprises a target object and one or more object members (target data objects) of the target object, the request further comprising identifiers of the target data objects, the method further comprising associating the index of the next free entry in the shared log with each of the target data objects as a time reference indicative of their most recent updates.

14. The non-transitory computer-readable storage medium of claim 10, wherein the request to verify a transaction further includes a VERIFIED parameter, wherein the computer executable instructions, which when executed by the computer device, further cause the computer device to allocate a next free entry in the shared log to store the transaction in response to a determination that the source data objects have not been updated between the snapshot time and the most current entry in the shared log.

15. An apparatus comprising:
one or more computer processors; and
a computer-readable storage medium comprising instructions for controlling the one or more computer processors to be operable to:
receive a request from a client machine to verify a transaction that comprises a source object and one or more object members (source data objects) of the source object, the request comprising identifiers of the source data objects, and further comprising a snapshot time that represents a data state of the source data objects used to produce a transaction result;
compare the snapshot time to time references of the source data objects' most recent updates in the shared log to determine whether the snapshot time represents a most current data state of the source data objects; and
allocate a next free entry in the shared log to store the transaction in response to a determination that the snapshot time represents the most current data state of the source data objects, including:

communicating the client machine to commit the transaction to the shared log; and sending to the client machine an index of the next free entry, wherein the client machine commits the transaction to the shared log by sending the transaction and the index to a log manager module, thereby reducing processing burdens on the client machine when performing conflict resolution so as to allow the shared log system to scale up.

16. The apparatus of claim 15, wherein the source object comprises additional object members other than the source data objects, wherein the most current data states of the additional source data objects occur later in time than the snapshot time.

17. The apparatus of claim 15, wherein each of the source data objects is associated with a corresponding last-modified time that represents a time of last modification of that source data object, wherein the computer-readable storage medium further comprises instructions for controlling the one or more computer processors to be operable to compare the snapshot time with the last-modified time of each of the source data objects to determine whether the snapshot time represents a most current data state of the source data objects.

18. The apparatus of claim 15, wherein the transaction further comprises a target object and one or more object members (target data objects) of the target object, the request further comprising identifiers of the target data objects, the method further comprising associating the index of the next free entry in the shared log with each of the target data objects as a time reference indicative of their most recent updates.

19. The apparatus of claim 15, wherein the request to verify a transaction further includes a VERIFIED parameter, wherein the computer-readable storage medium further comprises instructions for controlling the one or more computer processors to be operable to allocate a next free entry in the shared log to store the transaction in response to a determination that the source data objects have not been updated between the snapshot time and the most current entry in the shared log.

* * * * *